(12) United States Patent
Jagadish et al.

(10) Patent No.: US 7,010,522 B1
(45) Date of Patent: Mar. 7, 2006

(54) METHOD OF PERFORMING APPROXIMATE SUBSTRING INDEXING

(75) Inventors: Hosagrahar Visvesvaraya Jagadish, Ann Arbor, MI (US); Nikolaos Koudas, Springfield, NJ (US); Shanmugavelayutham Muthukrishnan, Washington, DC (US); Divesh Srivastava, Summit, NJ (US)

(73) Assignee: AT&T Corp., New York, NY (US)

( * ) Notice: Subject to any disclaimer, the term of this patent is extended or adjusted under 35 U.S.C. 154(b) by 474 days.

(21) Appl. No.: 10/174,218

(22) Filed: Jun. 17, 2002

(51) Int. Cl.
*G06F 17/30* (2006.01)

(52) U.S. Cl. .......................................... 707/3; 707/102

(58) Field of Classification Search ............... 707/1–7, 707/100–102; 704/1, 4–9
See application file for complete search history.

(56) References Cited

U.S. PATENT DOCUMENTS

| | | | |
|---|---|---|---|
| 5,418,951 A * | 5/1995 | Damashek | 707/5 |
| 5,553,272 A | 9/1996 | Ranganathan et al. | |
| 5,761,538 A | 6/1998 | Hull | |
| 5,852,821 A | 12/1998 | Chen et al. | |
| 6,026,398 A * | 2/2000 | Brown et al. | 707/5 |
| 6,473,754 B1 * | 10/2002 | Matsubayashi et al. | 707/5 |
| 6,546,383 B1 * | 4/2003 | Ogawa | 707/2 |
| 6,681,222 B1 * | 1/2004 | Kabra et al. | 707/5 |
| 2003/0120647 A1 * | 6/2003 | Aiken et al. | 707/3 |
| 2003/0200199 A1 * | 10/2003 | Snyder | 707/2 |

OTHER PUBLICATIONS

Burkhardt et al, Q-Gram Based Database Searching Using a Suffix Array (QUASAR), ACM 1999, pp. 77-83.*
Jagadish et al, Using Q-Grams in DBMS for Approximate String Processing, Internet www.pages.stern.nyu.edu/~panos/publications/deb-dec2001.pdf, pp. 1-7.*

* cited by examiner

Primary Examiner—Debbie M. Le (57) ABSTRACT

Approximate substring indexing is accomplished by decomposing each string in a database into overlapping "positional q-grams", sequences of a predetermined length q, and containing information regarding the "position" of each q-gram within the string (i.e., $1^{st}$ q-gram, $4^{th}$ q-gram, etc.). An index is then formed of the tuples of the positional q-gram data (such as, for example, a B-tree index or a hash index). Each query applied to the database is similarly parsed into a plurality of positional q-grams (of the same length), and a candidate set of matches is found. Position-directed filtering is used to remove the candidates which have the q-grams in the wrong order and/or too far apart to form a "verified" output of matching candidates. If errors are permitted (defined in terms of an edit distance between each candidate and the query), an edit distance calculation can then be performed to produce the final set of matching strings.

10 Claims, 4 Drawing Sheets

FIG. 1

FIG. 3a  { ##a,#al,alg,lgo,gor,ori, rit,ith,thm,hm$,m$$ }

FIG. 3b  { (1,##a),(2,#al),(3,alg),(4,lgo), (5,gor),(6,ori),(7,rit),(8,ith), (9,thm),(10,hm$),(11,m$$) }

FIG. 2

```
Algorithm PDF {
    result = 0;
    for each string-identifier σ
        result = result ∪ AnyOneMatch(σ);
    return result;
}
AnyOneMatch(σ) {
    missing = 0;
    for (i=1;≤i_max;i++)
        for j ∈ pos(γ_i,σ)
            cost = SubMatch(σ,j+1,i+1);
            if ((missing + cost)<=k*q)
                return {σ};
        missing++;
    return 0;
}

SubMatch(σ,j,i) {
    if (i > i_max) return 0;
    if (j ∈ pos(γ_i,σ))
        return SubMatch(σ,j+1,i+1);
    mincost = 1 + SubMatch(σ,j+1,i);
        // Insertion error
    cost = 1 + SubMatch(σ,j,i+1);
        // Deletion error
    if (cost<mincost) mincost = cost;
    cost = 1 + SubMatch(σ,j+1,i+1);
        // Substitution error
    if (cost<mincost) mincost = cost;
    return mincost;
}
```

METHOD OF PERFORMING APPROXIMATE SUBSTRING INDEXING

TECHNICAL FIELD

The present invention relates to performing matches of substrings to large collections of string data in a database and, more particularly, to the use of positional q-grams, maintained in an index structure, to efficiently find approximately all database strings that contain a particular query substring.

BACKGROUND OF THE INVENTION

String data is ubiquitous. For example, product catalog databases (for books, music, software and the like), electronic white and yellow page directories, and specialized information sources such as patent databases and bibliographic databases, all of which deal with string (text) data, are proliferating on the Internet. Most applications now have a prominent interface that allows string-based querying and searching. A critical requirement in this context is the ability to use a specified substring (referred to as a "query" substring) to find all of its occurrences in a particular database. Sometimes, one may be interested in a prefix (or suffix) match, where the specified substring occurs at the beginning (or, alternatively, the end) of the database string. At other times, one may simply be interested in a substring occurrence irrespective of its location.

The quality of the string information residing in various databases can be degraded due to a variety of reasons, including human error (particularly when human data entry methods are used to add information to the database). Moreover, the querying agent may itself make errors in specifying the pattern desired, as would occur with a misspelling in a query substring, such as with a name. In any event, there are many occasions where a given query pattern does not exactly match the database strings that one would presume as a "match" but for the mis-spellings or other data entry errors.

As an example, consider a well-known database textbook by Silberschatz, Korth and Sudarshan. One public website has the last author's name mis-spelled as "Sudershan". Therefore, someone performing a query in this particular database to find all books authored by "Sudarshan" will never find this well-known database textbook. Such an error is not unique. For example, there is a well-known author of books on the subject of theoretical physics with the name "E. C. G. Sudershan". The database entries for some of his books have the last name spelled "Sudershan" and others use "Sudarshan". In any event, a search for "books by the same author" will result in producing an incomplete listing.

A large body of work has been devoted to the development of efficient main memory solutions to the approximate string matching problem. For two strings of length n and m, available in main memory, there exists a dynamic programming algorithm to compute the edit distance of the strings in O(nm) time and space. Improvements to the basic algorithm have appeared, offering better average and worst case running times, as well as graceful space behavior. A different approach is based on the use of deterministic and non-deterministic automata. Although such approaches are best in terms of worst case, they have large space requirements and they are relatively difficult to build and maintain.

To handle larger text queries in main memory, various approaches have been introduced. Several researchers have reduced the problem of "approximate" string searching to that of "exact" searching, which is well understood. The basic idea is as follows: For a string that occurs in a text with k errors, if the query string is arbitrarily cut into k+1 pieces, then at least one of the pieces will be present in the text with no errors. An additional approach to reduce the problem of approximate string matching to that of exact string matching is to use all (or part) of overlapping pieces of length q (defined as "q-grams"). E. Sutinen et al., in the reference "On Using q-gram Locations In Approximate String Matching", appearing in *Proceedings of the ESA*, 1995, discuss how to perform a search by examining samples of q-grams separated by a specific number of characters.

The subject of approximating the identification of relevant strings in secondary storage is a relatively new area. Indexes are used to store a dictionary and use a main memory algorithm to obtain a set of words to retrieve from the strings in storage. Exact text searching is thereafter applied. These approaches are rather limited in scope, due to the static nature of the dictionary, and are not considered suitable for dynamic environments or when the domain of possible strings is unbounded. Other approaches rely on suffix trees to guide the search for approximate string matches. However, suffix trees impose very large space requirements. Moreover, they are relatively static structures, and are hard to efficiently maintain in secondary storage. Thus, the use of suffix trees is not considered as well-suited for database applications.

Thus, a need remains in the art to be able to efficiently find all strings approximately containing a given query substring from a large collection of strings.

SUMMARY OF THE INVENTION

The need remaining in the art is addressed by the present invention, which relates to performing matching of substrings to large collections of string data in a database and, more particularly, to the use of positional q-grams to efficiently find approximately all database strings that contain a particular query substring.

In accordance with the present invention, both the database strings and each query string are decomposed into a plurality of overlapping "positional q-grams" which are sequences of q characters augmented with positional information (i.e., $1^{st}$ q-gram in the sequence, $2^{nd}$ q-gram in the sequence, and so on). Position-directed filtering is then used to find approximate matches based on two observations: (1) the database string must have a certain minimum number of matching query q-grams, and (2) the positions of these matches must be in the right order and cannot be too far apart.

The set of all strings forming the database is preprocessed to form the plurality of positional q-grams, which are then maintained in an index (such as for example, a B-tree index or a hash index) for later searching and retrieval of matches in response to a given query, using q-grams as keys. In particular, the index contains the q-grams as keys and the 2-tuples (string-identifier, position) as the value list for a given q-gram. For a given query string Q, all of its $|Q|+q-1$ q-grams are formed and the corresponding values are retrieved from the index. Position-directed filtering is then used to reduce the retrieved set to obtain a candidate set that is guaranteed not to have any false dismissals. Finally, a main memory dynamic programming algorithm is applied to verify whether the database string in the candidate set is indeed at the specified edit distance k from Q.

Other and further aspects of the present invention will become apparent during the course of the following discussion and by reference to the accompanying drawings.

BRIEF DESCRIPTION OF THE DRAWINGS

Referring now to the drawings,

FIGS. 5(*a*) and (*b*) contain graphs illustrating the average response time of the position-based approach of the present invention as compared against two prior art substring indexing methods; and FIGS. 6(*a*) and (*b*) contain graphs illustrating the average number of strings in candidate sets (and therefore the average number that need to be verified) as both k (the edit distance) and q (the sequence length of the q-gram) are varied.

DETAILED DESCRIPTION

Figure 1:
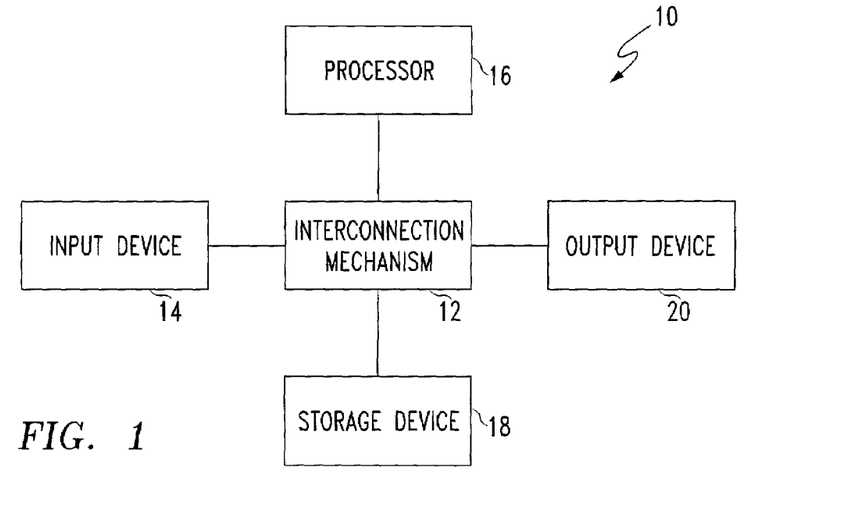
FIG. 1 illustrates an exemplary system (in simplified block diagram form) useful for implementing the positional q-gram substring indexing technique of the present invention.

The present invention generally comprises a system and method for searching and matching input search data against a database of records. The invention may be implemented on a computer system such as that represented in FIG. 1. Computer system 10 of FIG. 1 is represented by a set of generic components 12, 14, 16, 18 and 20 as found in most general-purpose computers. In particular, computer system 10 comprises an interconnection mechanism 12 such as a bus or circuitry which couples an input device 14 (such as a keyboard), a processor 16 (such as a microprocessor), a storage device 18 (such as a computer disk or memory) and an output device 20 (such as a monitor or screen). Various embodiments of the invention will be described below in conjunction with these components, interconnected in the manner shown in FIG. 1.

Figure 2:
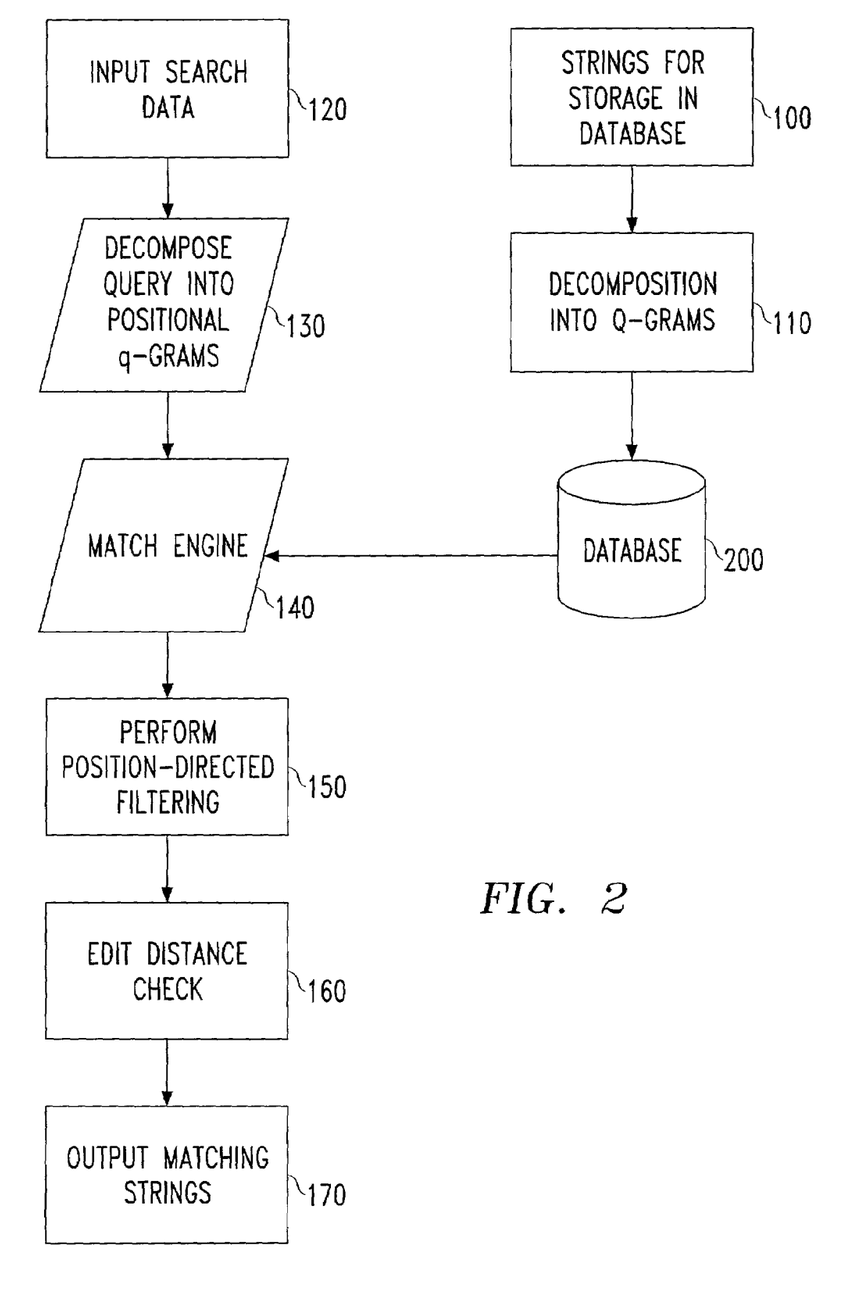
FIG. 2 is a flowchart illustrating the substring indexing technique of the present invention.
Figure 3A:
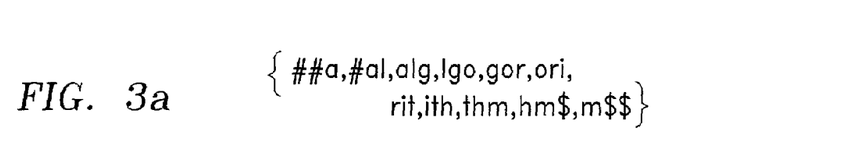
FIG. 3 contains an exemplary set of q-grams (FIG. 3(*a*)), as well as "positional q-grams" (FIG. 3(*b*)), for the string algorithm.

FIG. 2 shows the general nature of processing data in accordance with the present invention. Initially, a set of string data is collected for storage in a database (step 100). As discussed above, the string data, comprising text, may be extremely large, such as in the case of nationwide phone listings, email directory information, and the like. As will be discussed below, all of the data stored in the database is first broken into a plurality of q-grams (step 110), and its position and q-gram information stored as a 2-tuple in a positional B-tree arrangement. FIG. 3 illustrates an exemplary set of q-grams for the string algorithm, which include the character "#" as a prefix delimiter and the character "$" as a suffix delimiter, where in this example q=3. Also shown in FIG. 3, as will be discussed in detail below, is the set of positional q-grams for this string.

Referring back to FIG. 2, each string that is used to populate a database 200 is processed to form the information in FIG. 3, creating an index of the positional q-grams associated with each string. In this particular example, and as discussed in detail below throughout the following discussion, the index used is a B-tree index. It is to be understood that the concepts of the present invention could also be implemented using a hash index, or any other appropriate index structure, to identify the string information stored in database 200. Once database 200 is populated, an input query substring Q may be applied as an input (step 120) and the system and method of the present invention used to approximately find the relevant matches from database 200. As with the database string information itself, the input substring query is first decomposed into a plurality of q-grams, of the same size q as the stored data (step 130). A matching routine is then performed to retrieve all value lists from the B-tree index with corresponding values to the input q-grams (step 140). As will be discussed in detail below, position directed filtering is then performed (step 150) to ensure that the retrieved q-grams appear in the same order as the q-grams in the query substring. Lastly, a verification program is used (step 160) to check whether or not the candidate set is within the specified "edit distance" from input substring query Q. The strings that are found to fall within the edit distance are then produced as an output of the system (170). Referring back to FIG. 1, database 200 may reside in storage device 18, with processor 16 used to perform the parsing of the string data into q-grams, matching of query Q against the stored data, position-directed filtering and edit distance checking. Input device 14 is used to submit substring query Q (step 120 of FIG. 2), where the relevant output (from step 170 of FIG. 2) is sent to output device 20, such as a monitor.

With this high-level understanding of the system and method of the present invention, the details of its implementation, as well as a comparison of its performance against prior art methods will be described in detail. For these purposes, the following definitions will be useful: let $\Sigma$ represent a finite alphabet of size $|\Sigma|$. Strings will be denoted by lower-case Greek characters, such as $\sigma$, possibly with subscripts, to denote strings in $\Sigma^*$. Let $\sigma \in \Sigma^*$ be defined as a string of length n. The notation $\sigma[i \ldots j]$, $1 \leq i \leq j \leq n$ is used to denote a substring of $\sigma$ of length $j-i+1$, starting at position i.

The "edit distance" between two strings (denoted as k) is then defined as the minimum number of edit operations ("insertion", "deletion", "substitution"), of single characters, needed to transform the first string into the second string. For two strings $\sigma_1$ and $\sigma_2$, the edit distance is symmetric and $0 \leq d(\sigma_1, \sigma_2) \leq \max(|\sigma_1|, |\sigma_2|)$. As an example, consider the string algarithm as discussed in association with FIG. 3. The strings algarithm, algrithm, and algoorithm are each at an edit distance k=1 from algorithm (requiring one "substitution", one "insertion", and one "deletion", respectively). The string algoorim is defined as being at an edit distance k=3, as a result of requiring one deletion (of an "o"), and two insertions (of the two characters "t" and "h").

For the purposes of the following discussion, it is presumed that $D = \{\sigma_1, \sigma_2, \ldots, \sigma_n\}$ is a set of strings stored in a database such as database 200 of FIG. 2. The strings are of various lengths and database 200 is large and stored in off-line storage device 18 (as opposed to being stored in a main memory area of processor 16). As discussed above, each string $\sigma_i$ is preprocessed into a plurality of q-grams and a B-tree index is created including the position information and the q-gram. B-tree indexing is used since it is relatively simple to update D to account for insertions, deletions and substitutions, as well as to add new data strings. Thus, the purpose of the present invention is to retrieve, given a query string Q, all strings $\sigma$ from the set D that contain a substring at some predetermined edit distance k from the query string Q. More formally, given a string query Q and an integer k, retrieve all strings $\sigma_i \in D$ such that, for some substring $\rho_j$ of $\sigma i$, the value edit_distance(Q, $\rho_j$)=k. In terms of "prefix" matching, the above statement can be re-worded as follows: for a string query Q and an integer k, retrieve all strings $\sigma_i \in D$ such that for some prefix $\rho_j$ of $\sigma_i$, the value edit_distance(Q, $\rho_j$)=k. In a similar manner, the retrieval of approximate suffix and full matches can be formulated as well. Moreover, variations of the above exist in which there is an interest in locating all strings containing substrings (or prefixes, suffixes, etc.) at no more than some specified edit distance from a query string.

Of the known prior art work on string matching, the methodology employed by Navarro et al., as discussed in the article "A practical q-gram index for text retrieval allowing errors" appearing in *CLEI Electronic Journal*, 1(2), 1998, is useful in understanding the subject matter of the present invention. Navarro et al. utilize B-tree indexes to perform approximate matching of strings (as opposed to the use of substrings in the present invention) in a disk-resident database. The approach of Navarro et al. is based on the following observation, which originated in the context of main memory approximate string matching algorithms. That is, given all q-grams of length q of a string $\sigma$, a test can be made to determine if a query string Q could be at edit distance k from $\sigma$, by chopping Q into k+1 non-overlapping pieces and trying to exactly match each of the pieces against the q-grams of $\sigma$. The observation is that one of the k+1 pieces should either match exactly or have a prefix match. Therefore, by retrieving the strings that match at least one of the pieces, it can be assured that there are no false dismissals (i.e., elimination of strings that are an approximate match). The query string Q still needs to be tested against $\sigma$ in main memory, using an algorithm that decides if the strings are within edit distance k. This observation, however, provides a means to filter out strings that cannot possibly be in the answer query.

Given a string collection D, Navarro et al. propose to construct all q-grams of all strings and insert them in a B-tree. Then, given a query string, Q, to be matched with k errors against the collection, Q is decomposed into k+1 pieces and each piece is matched exactly against the collection of q-grams. If a piece is of length longer than q, it is truncated to length q, and an "exact match" search is used. If a piece is of length shorter than q, a prefix match is performed against the B-tree. In the Navarro et al. method, the union of all strings returned from each of the k+1 queries is the set of candidate strings to be verified with a main memory algorithm against the query string Q.

Using this prior art method, it is recognized that the number of candidate strings returned could be large. Thus, Navarro et al. propose an optimization to reduce the size of the candidate set: given either exact or approximate selectivity values of substrings in the string collection D, a dynamic programming algorithm is used to identify the "best" k points at which to "chop" Q, such that the number of strings returned from each B-tree search is minimized.

The "chopping" technique of Navarro et al. yields the following principle that is also valid for the methodology of the present invention: A set of candidate answers is formed assuring no false dismissals which is further refined with an exact algorithm to eliminate false positives. Based on this principle, the present invention provides a two-step solution to the problem of substring indexing. First, a q-gram based approach is used to retrieve a set of candidate answers assuring no false dismissals. Second, an in-memory algorithm is used to verify the edit distance.

While there has been a large body of work on efficiently finding the edit distance between two strings, it is a computationally intensive task. Verifying that a database string $\sigma$ has a substring $\rho$ that is at edit distance k from a query string Q is even more computationally intensive.

The "chopping" technique of Navarro et al. is used to attempt to minimize the I/O cost of obtaining a set of candidate answers. For the problem of substring matching, however, this "chopping" technique has the consequence (possibly counterintuitive) of producing a large candidate set with many false positives, as will be explained hereinbelow, particularly as k increases. Thus, a computationally expensive verification process, using main memory computation, will be required to "weed out" the irrelevant material.

Thus, in accordance with the present invention, the information conveyed by all (overlapping) q-grams of the query string Q is used against the q-grams obtained from the database of strings D. For a specific D, the selectivity of each q-gram depends only on the q-gram length, which can be fixed in advance. As discussed above, the process begins by first inserting all q-grams obtained from strings in D into an index (such as a B-tree index or a hash index), using the q-gram as the key. For the purposes of the present invention, the list of string-identifiers of strings containing a specific q-gram is defined as the "value list" of the q-gram. It is observed that by retrieving the value list for each q-gram of the query string, it is possible to derive a lower bound for the necessary number of matching q-grams that a retrieved string-identifier should have with the query string in order to be considered as a candidate match.

Prefix match queries are specified by using q−1 "#" characters prefixed to the query string and q−1 "?" characters suffixed to the query string. Substring match queries, in general, are specified by q−1 "?" characters prefixed to the query string and q−1 "?" characters suffixed to the query string. As discussed above, the "#" characters are (conceptually at least) prefixed to each database string and "$" characters are suffixed to each string. Each of these characters only matches against itself. The "?" character is not a specific character at all, but rather a "wildcard" that matches any one character, whether it is a regular character from the alphabet or one of the two special characters just mentioned above.

As a first proposition in understanding the details of the present invention, let $G_\sigma$ be defined as the set of q-grams (of length q) for a given database string $\sigma$. Let $G_Q$ be defined as the set of q-grams for a substring query Q (of length m). If there exists a string $\rho$, at edit distance k from Q, such that $\rho$ is a substring of $\sigma$, then the cardinality of $G_Q \cap G_\sigma$ is at least m−1−(k−1)q, a lower bound for the number of matching q-grams. In general, lower bounding the number of matching q-grams for a string-identifier provides a way to filter out a number of string identifiers retrieved, since anything below that bound cannot possibly yield approximate substring matches to the query string. Of course, satisfaction of this test is a necessary but not a sufficient condition. Each candidate match must be further examined, but lower bounding will at least reduce the number of candidates to be examined. For the purposes of the present invention, this first step of filtering achieved by bounding the number of matching q-grams for a string-identifier is defined as "bound filtering".

Query processing employing bound filtering proceeds as follows, assuming that an index has first been computed for all q-grams of each database string in D. First, for a given query string $\sigma$, its $|\sigma|+q-1$ q-grams are formed, as described above. For each of these q-grams, its value list (i.e., the list containing all database strings that contain this specified q-gram as a substring) is retrieved from the index. Any string σ that appears in at least |σ|−1−(k−1)q of these lists is then a candidate approximate match.

In accordance with the present invention, the size of the candidate set is then reduced by using information about the positions at which the q-grams occur in the query and database strings. For example, consider an approximate prefix string query atho, where the request is to retrieve database strings that have the prefix atho with one error (i.e., an edit distance of 1). Presuming that q-grams of length 2 are to be used, the q-grams of the given prefix query would be {#a, at, th, ho, o?}. If one of the database strings was amphitheater (consisting of the q-grams {#a, am, mp, ph, hi, it, th, he, ea, at, te, er, r?}), then three of the five q-grams from the prefix query would match q-grams from amphitheater, namely the bolded subset {#a, th, at}. Thus, without further verification, query processing employing bound filtering would infer that amphitheater is in the candidate set, even though the database string is clearly not a correct answer to the query.

Figure 3B:
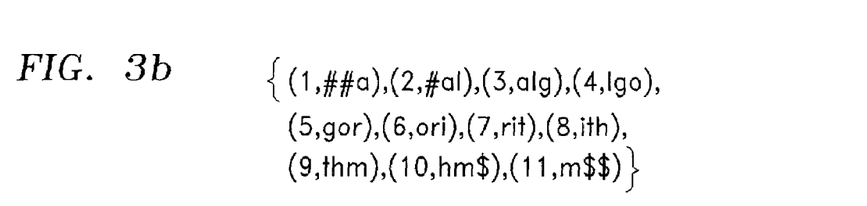

It is to be noted, however, that while the three matching q-grams #a, at and th are adjacent to each other in the query, they are far apart (and in the wrong order) in the database string. Therefore, by making use of positional information regarding the q-grams, in accordance with the present invention, the database string amphitheater is pruned away from the candidate set, making the main memory verification step less expensive. This positional information is stored, as shown in FIG. 3(b) and mentioned above, by using "positional q-grams", which enhance the q-gram representation with the position of the first q-gram character in the string. In particular, FIG. 3(b) contains the set of positional q-grams (of length 3) for the string algorithm.

The data structure needed to take advantage of positional information is not much different than the prior art data structures that neglected this information. First, for each string in the database, its q-grams are computed and inserted in an index—for example, a B-tree index—using the q-gram as the search key and the tuples (position, string-identifier) as the value list. Query processing for a given substring query Q then proceeds by first computing all of the overlapping q-grams of the substring query Q, where there will be |Q|+q−1 such q-grams. For each q-gram, the B-tree index is queried and the value lists are retrieved. By using positional q-grams, valuable information is retrieved for the purposes of improving the subsequent filtering process.

If the edit distance k is 0 (i.e., the "exact match" case), processing is straightforward. Any q-gram can be used, and in particular the first q-gram in the query, to determine the position(s) in which the given query string can be found in the candidate database string. Successive query q-grams must occur at successive positions for a match to be determined.

Figure 4:
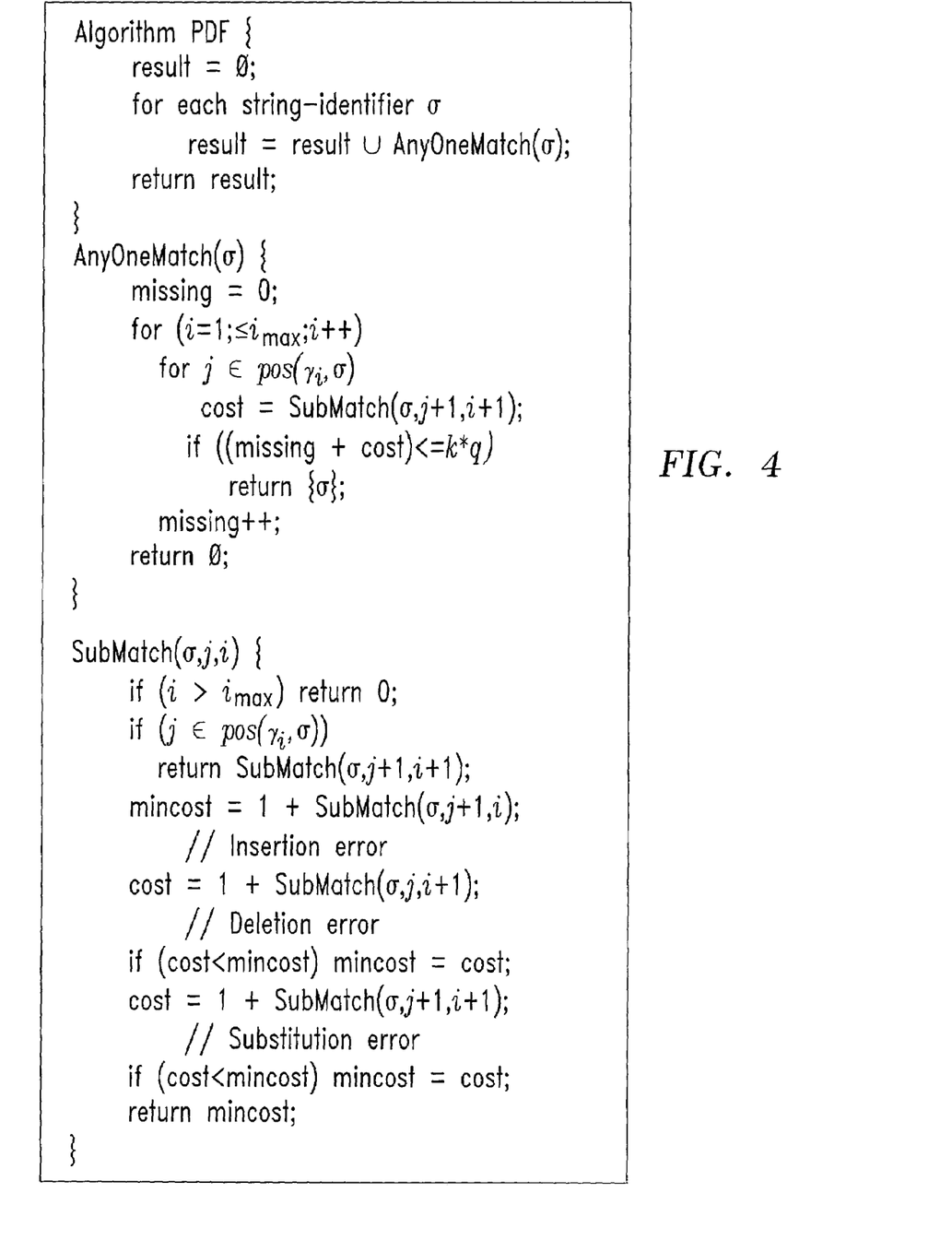
FIG. 4 illustrates an exemplary process flow for performing position-directed filtering in accordance with the present invention.

Once errors are permitted, query processing becomes more complicated, since any given q-gram in the query may not occur at all in the candidate database string of interest, and the positions of successive q-grams may be off, due to insertions and deletions. Furthermore, as always, it must be kept in mind that a query q-gram may occur at multiple positions in a database string. To overcome these problems, a technique of position-directed filtering, as shown in FIG. 4, is used that takes q-gram positions into account to perform improved filtering. In particular, position directed filtering is based on the observations that: (1) the database string must have a certain minimum number of matching query q-grams; and (2) the positions of these matches must be in the right order and not too far apart. Referring to FIG. 4, let $\gamma_i$ be the $i^{th}$ q-gram in a specified query Q, where $1 \leq i \leq i_{max} = |Q|+q-1$. Let pos($\gamma_i$, σ) be defined as the set of positions in σ at which q-gram $\gamma_i$ occurs; this set may be empty. The position-directed filtering process, as shown in FIG. 4, employs position-directed filtering to identify a candidate set. Pruning based on positions is then a consequence of: (1) the cost computation in SubMatch, and (2) the thresholding in the fifth line of AnyOneMatch.

Summarizing, therefore, the inventive technique for finding approximate substring matches (substring indexing) can be defined as consisting of the following steps: (1) preprocessing: given a collection D of strings, and a q-gram length q, for each string σ ∈ D, first form its |σ|+q−1 positional q-grams of length q, and insert them in an appropriate index structure, such as a B-tree index or a hash index, (in the case of a B-tree index, the index is configured to contain the q-grams as keys and the 2-tuples (position, string-identifier) as the value list for a given q-gram); (2) then, for a given query string Q, all of its |Q|+q+1 q-grams are formed, (for these q-grams, the corresponding value lists are retrieved, using the constructed index); (3) next, position-directed filtering, as shown in FIG. 4, is applied to the string-identifiers in the value lists to obtain a candidate set (by using the position information, this retrieval process is guaranteed not to have any false dismissals) and (4) finally, a main memory dynamic programming algorithm is applied to verify whether the database string in the candidate set is indeed at the specified edit distance k from Q.

As discussed above, a standard B-tree structure works well for indexing the string data that needs to be accessed and searched, since q-grams can be sorted lexicographically. The leaf pages of the index contain the actual q-grams and pointers to the value list for each q-gram, such that if position, string-identifier) occurs in the value list of a given q-gram $\gamma_j$, then the string $\sigma_i$ with the given string-identifier has as substring $\gamma_j$ at the given position. As a result, given a q-gram γ, a single traversal of the B-tree index will return the list of identifiers of strings (as well as their positions) containing γ, or return a "null set" if γ is not present in the index.

Position-directed filtering requires that entries for the same string in each of these lists be manipulated. Since each of these lists can be stored by being sorted primarily on the string-identifier, with a secondary sort on position, this task can be performed efficiently with limited main memory. Using a procedure similar to an m-way external merge, each value list can be read in one page at a time, while fetching the next page to keep the "current" (position, string-identifier) pair roughly in synchrony. Only m pages of memory are required, where m is the number of q-grams in the query string.

For purposes of the index structure, "#" and "$" are treated, as mentioned above, as characters in the (extended) alphabet. These characters can have any lexicographic sorting relationship with the regular characters, as long as the relationship is consistently applied. However, this is not the case for the wildcard character "?", since this character does not occur in the extended database strings in the index. In effect, rather than performing a single q-gram look-up, a set of |Σ| look-ups must be performed, one for each possible match of the wildcard character—for a q-gram that contains only a single wildcard character. In this regard, wildcards at the beginning of a q-gram are more troubling than wildcards at the end, since the latter still permit a single look-up in the B-tree using the portion of the q-gram before the wildcard, making use of the lexicographic sort order of q-grams in the B-tree. As explained below, it is possible to convert all look-ups containing wildcards to ones where the wildcards appear only at the end of the query q-gram.

For example, consider a specific q-gram $\xi_1 \alpha \xi_2$, where $\xi_1$ comprises q−r>0 unspecified "?" characters and is followed by α that comprises $r_1$>0 regular characters, and $\xi_2$ that comprises r−$r_1$≦0 "?" characters. For every match of $\xi_1 \alpha \xi_2$ in a string σ at position p, there is a match of $\alpha \xi_2 \xi_1$ in string σ at position p+q−r. Conversely, for every match of $\alpha \xi_2 \xi_1$ in a string σ at position p, there is a match of $\xi_1 \alpha \xi_2$ in string σ at position p−q+r. Following the same logic, therefore, every q-gram in every prefix, suffix, substring and full-match query can be equivalenced, for indexing purposes, with a q-gram that has the unspecified "?" character (if appearing at all in the q-gram) positioned as the last character in the q-gram.

Once errors are allowed in the strings, it is no longer sufficient to just consider the completely specified q-grams, even though the subset relationships continue to hold. That is, since the less restrictive (superset) may be satisfied without satisfying the more restrictive (subset), there is a need to find all of these occurrences. There are three different scenarios where this may happen, one corresponding to each edit operation (insert, delete, substitute). For each of these three possibilities, a new q-gram can be created, with one less wildcard than the original, and an index generated for these q-grams. Applying this process as many times as needed yields the following result: let k be the number of errors allowed, and r>k be the number of wildcards in a q-gram γ of a given query string σ. Then, every look-up of γ can be replaced by no more than $3^{r-k}$ look-ups of other q-grams, each with no more than k wildcards. In other words, the number of sorted lists to be merged on account of a q-gram with r wildcards is upper-bounded by $|\Sigma|^k \times 3^{r-k}$, instead of the simpler $|\Sigma|^r$. Since 3 is expected to be substantially less than the size of the alphabet $|\Sigma|$, the savings can be quite substantial. It is generally expected that both k and q (as well as r, which is always less than q) will be small numbers. Therefore, the above techniques are considered to remain practical for realistic values, in spite of the exponential dependence in this upper bound.

As an example, suppose that q=3 and k=1. Consider performing an approximate substring match for the query string mati. First, the query q-grams are created: m??, ma?, mat, ati, ti? and i??. Next, consider the second q-gram, ma?. If no errors in matching are allowed, the only satisfaction of this q-gram that would be cared about would be mat. However, with the possibility of one error, every regular character would have to be considered in the match to "?" in this q-gram. With respect to the first q-gram, m??, the only response of interest would be mat. With one error, the possibilities expand to ma?, m?a (associated with insertion), m?t (associated with substitution) and mti (associated with deletion). The first of these possibilities has already been taken care of through the second q-gram. The remaining three alternatives remain to be indexed. In a similar manner, rather than first computing the index for i??, it suffices to compute the index for mai (deletion), t?i (insertion), and a?i (substitution).

Figure 5A:
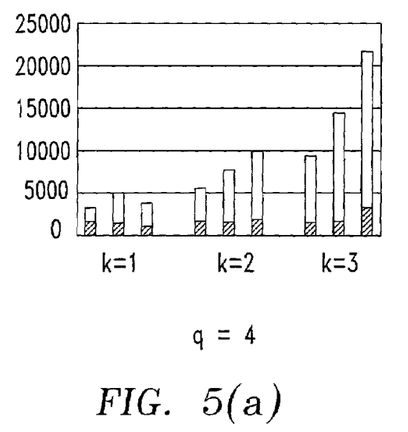
Figure 5B:
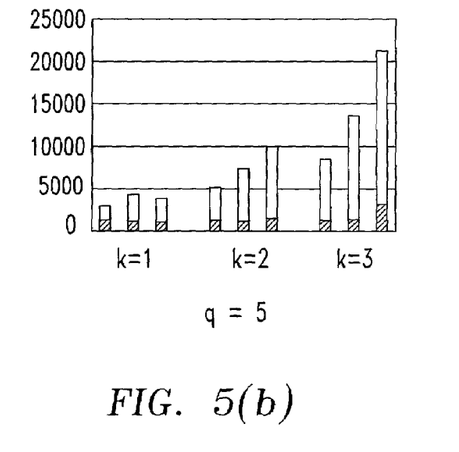
Figure 6A:
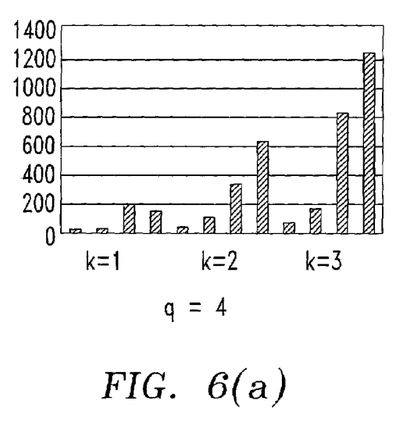
Figure 6B:
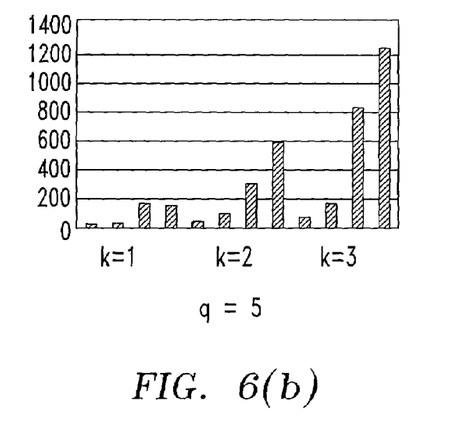

FIGS. 5–7 illustrate various comparisons of the approximate substring indexing methodology of the present invention against the "chopping" technique as disclosed in the prior art Navarro et al. reference. As discussed above, the Navarro et al. technique partitions a given query string into k+1 pieces and retrieves the q-grams corresponding to each piece. After retrieval, a dynamic, programming-based, main memory algorithm for checking substring edit distance is then run on each string in the union of the retrieved value lists. To better quantify the benefits of the position-directed filtering technique of the present invention, the performance of an alternative method, based on retrieving the set of lists corresponding to each q-gram of the query string was also used, deriving the unique gram of the query string without utilizing any of the filtering techniques of the present invention. For each method, the algorithms were implemented in C, under a Sun Microsystems operating system. The experimental platform consisted of a SUN-10 Enterprise Server, with approximately 6 MB/s I/O bandwidth. The I/O operations were performed using the stream I/O interface, with time measurements performed using interval timers provided by the kernel.

Multiple, real data sets were used, extracted from an AT&T warehouse, where the data set contained 500K strings, of length between 7 and 14 characters. Sufficiently long string queries were used in order to be able to increase the number of errors allowed for experimental purposes, while still being able to keep the response time manageable for the experiments.

Two crucial parameters associated with the performance of the various techniques are k, the number of errors allowed, and q, the length of the q-gram. These parameters were varied during the experiments so as to measure the comparative performance and effectiveness of the algorithms in terms of (i) response time, and (ii) the average number of strings in the candidate set.

To gain a better understanding of the time each algorithm spends during its various phases, the "response time" of each technique can be broken down into three parts: (1) "read" corresponds to the average time each algorithm spends retrieving value lists from the disk (in the case of the Navarro et al. "chopping" approach, this time includes the time to derive the partitioning using dynamic programming); (2) "sort" corresponds to the time used to eliminate duplicates in memory (since string-identifiers may belong to multiple lists), as well as the time spent performing filtering, if used, (for these experiments, all of the value lists corresponding to the q-grams retrieved fit in main memory, so this phase of each algorithm is truly a measurement of processor time wherein the general case, if the lists do not fit in memory, they are stored in sorted (by string-identifier) order on disk, so duplication elimination and filtering can easily be performed by retrieving each list once and performing a multi-way merge); and (3) "check" corresponds to the average time required to check all of the edit distances of each string in the candidate set against a query string, using a main memory dynamic programming algorithm. For each string selected of length |σ|, a query substring was derived with length uniformly distributed in the interval (q+1, |σ|).

FIGS. 5(a) and (b) illustrate the average response times (in milliseconds) for the three algorithms as defined above (i.e., the position-directed filter of the present invention, the Navarro et al. chopping method, and the non-filtered direct method). The response times for a varying number of errors (from k=1 to k=3) are shown for two different q-gram lengths, where FIG. 5(a) illustrates the response times for a q-gram length of 4 and FIG. 5(b) illustrates the response times for a q-gram length of 5. As shown, the "read" portion is the same for both the method of the present invention and the prior art non-filtered approach, since both retrieve exactly the same lists of q-grams from the disk. However, the non-filtered approach utilizes only duplicate elimination (in contrast to the technique of the present invention to apply position-directed filtering). Indeed, the time required to perform filtering for the present invention is almost the same as the time required to perform duplication elimination for the prior art methods, since duplicate elimination and filtering are performed in a similar fashion. For the "chopping" approach of Navarro et al., the time to read depends heavily, as shown, on the number of errors allowed, since the algorithm decomposes the query into a number of pieces and retrieves value lists for each piece. Further, if a piece is of a length shorter than q, the "chop" algorithm will retrieve all the q-grams in the collection containing the query piece as a prefix.

In FIGS. 5(a) and 5(b), it is observed that if one error is allowed, the average time to read the strings from disk is smaller for the prior art chopping approach than either q-gram-based method (even though the total response time is higher for the chopping approach). This is due to the fact that both q-gram based methods perform two prefix matches, whereas the chopping approach (for one allowed error) performs at most one prefix match. As the number of errors increases, however, the time spent on retrieving value lists for q-grams from disk increases for the chopping approach. This observation is consistent for both q-gram lengths, as seen by comparing FIG. 5(a) to FIG. 5(b).

The time spent to perform duplication elimination and filters is almost the same for the q-gram methods, for given values of k and q. In contrast, the time required to perform duplication elimination for the chopping algorithm is slightly less for one error (since fewer lists are retrieved from disk) and increases to become greater than the other two methods as the number of errors increases.

Indeed, the time required to verify the candidates appears to be the main performance bottleneck for each method; FIGS. 5(a) and 5(b) include in their graphs the average time required to perform the "verification" for each candidate set. The position directed filtering technique of the present invention has been found to be extremely effective in terms of decreasing the size of the candidate set of strings to be checked by an exact algorithm. As shown, using k=1, the size of the candidate set to be verified for "chopping" is less than that required for the filtering technique of the present invention, while both sets are much larger than that associated with the non-filtered q-gram approach. This is due to the smaller number of value lists retrieved, as no filtering is employed by either prior art algorithm. As the number of errors increases, the size of the retrieved list, as well as the time required to perform the verification, increases for the "chopping" approach. Referring to FIGS. 5(a) and 5(b), it can be seen that for the range of errors allowed and q-gram lengths tested, the time required to perform the verification for the filtering approach of the present invention is about half of the time required for either prior art method.

Moreover, both FIGS. 5(a) and 5(b) illustrate a trend toward an increase in overall response time of both q-gram approaches as the length of the q-gram decreases. This is mainly due to a larger number of q-grams being retrieved during prefix matches. The "chopping" algorithm retrieves q-gram lists based on prefix matching and hence is affected by the q-gram length as well.

FIGS. 6(a) and 6(b) contain graphs illustrating the average number of strings in the candidate sets (and hence the strings verified by the main memory algorithm) as both k and q are varied. These figures present the average actual number of database strings that are at the specified edit distance of k from the query string (denoted as "exact") in FIGS. 6(a) and 6(b), as well as the average number of strings in the candidate sets for the three different techniques. As can be seen, the filtering technique of the present invention is extremely effective in reducing the candidate set size. This is essentially a function of k, the number of errors allowed, with fewer errors yielding the better accuracy. In contrast, the prior art techniques (which do not employ filtering) have a very large number of strings in the candidate set to be verified, especially as the number of allowed errors increases.

It is noted that the present invention may be implemented in hardware or circuitry which embodies the logic and processing disclosed herein or, alternatively, the present invention may be implemented in software in the form of a computer program stored on a computer-readable medium such as storage device 18 shown in FIG. 1. In the latter case, the present invention in the form of computer program logic and executable instructions is read and executed by processor 16, which instructs computer system 10 to perform the functionality disclosed as the invention herein. Furthermore, combinations of embodiments of the invention may be divided into specific functions and implemented on different individual computer processing devices and systems which may be interconnected to communicate and interact with each other. Dividing up the functionality of the invention between several different computers is, therefore, covered within the scope of the invention.

While this invention has been particularly shown and described with references to a preferred embodiment thereof, it will be understood by those skilled in the art that various modifications may be made without departing from the spirit and scope of the present invention, which is defined by the following claims appended hereto.

What is claimed is:

1. A method of indexing a query substring Q against a collection of data strings in a database D, the method comprising the steps of:
   a) preprocessing each string σ in database D to generate a plurality of overlapping q-grams of a predetermined length q augmenting each q-gram with information indicating its position within string σ to form a tuple comprising the position information and the q-gram, and creating an index of the positional q-gram tuple;
   b) parsing the query substring Q into a plurality of overlapping positional q-grams of length q;
   c) searching each index in database D to retrieve potential matches between the query Q substring plurality of overlapping q-grams and the preprocessed database D plurality of overlapping q-grams, a potential match defined as having a predetermined number of matching overlapping q-grams;
   d) applying position-directed filtering to the potential matches retrieved in step c) to form a candidate set including only those potential matches with at least some q-grams in the same position order as substring query Q
   e) defining a predetermined maximum edit distance k between the query substring Q and database D;
   f) after applying the position-directed filtering, calculating the edit distance between each candidate substring and the query substring; and
   g) verifying the candidate set by removing from the candidate set each candidate substring having an edit distance greater than k.

2. The method as defined in claim 1 wherein in performing step d) the candidate set is reduced by maintaining only the potential matches with a majority of its q-grams in the same position order as substring query Q.

3. The method as defined in claim 1, wherein in performing step a), a B-tree index is created for each positional q-gram tuple.

4. The method as defined in claim 1, wherein in performing step a), a hash index is created for each positional q-gram tuple.

5. The method as defined in claim 1 wherein in performing step d), the following steps are performed:
   i) determining a predetermined number of q-gram matches required to define a substring match and a predetermined maximum separation distance; and
   ii) comparing the order of the candidate matching q-grams against the query q-grams, retaining only candidate substrings with at least the predetermined number of q-gram matches in the same order as the query substring within the predetermined maximum separation distance.

6. The method as defined in claim 1 wherein the edit distance k is defined as the total number of changes, in terms of additions, deletions, and substitutions, required to transform the candidate substring into the query substring.

7. The method as defined in claim 1 wherein k=0 and exact matching is required.

8. A database processing and searching system comprising:
   a computing arrangement including an input device for receiving a query substring Q to be searched, a processor, an output device and a storage device; and
   a database D of string data stored on the storage device using an index of positional q-grams for each string, each q-gram overlapping with its neighbor and stored as a tuple containing both the q-gram and information related to its position within the string, wherein the computing arrangement is used to defined a predetermined maximum edit distance k between the query substring Q and a database D,
   the processor for parsing a given query substring into a plurality of overlapping q-grams and searching each index in the database to determine candidate matching strings, a potential matching string and calculate the edit distance between each candidate substring and the edit distance between each candidate substring and the query substring; defined as having a predetermined number of matching overlapping q-grams, said processor further comprising a position-directed filtering element for eliminating candidate strings having at least one of the following characteristics: (1) q-grams in a different position order (2) q-grams in the same position but separated by greater than a predetermined distance when compared to the query substring, and (3) candidate strings having an edit distance greater than k, to form a verified candidate string set, wherein the processor passes the verified candidate string set to the output device as the output of the database processing and searching system.

9. The database processing and searching system as defined in claim 8 wherein B-tree indexes are used to store the positional q-gram information in the database.

10. The database processing and searching system as defined in claim 8 wherein hash indexes are used to store the positional q-gram information in the database.

* * * * *